(12) United States Patent
Drobnik

(10) Patent No.: US 9,225,191 B2
(45) Date of Patent: *Dec. 29, 2015

(54) CIRCUIT AND METHOD FOR VOLTAGE EQUALIZATION IN LARGE BATTERIES

(71) Applicant: Josef Drobnik, Mesa, AZ (US)

(72) Inventor: Josef Drobnik, Mesa, AZ (US)

(73) Assignee: Freescale Semiconductor, Inc., Austin, TX (US)

(*) Notice: Subject to any disclaimer, the term of this patent is extended or adjusted under 35 U.S.C. 154(b) by 367 days.

This patent is subject to a terminal disclaimer.

(21) Appl. No.: 13/770,070

(22) Filed: Feb. 19, 2013

(65) Prior Publication Data

US 2014/0232344 A1 Aug. 21, 2014

(51) Int. Cl.
*H02J 7/00* (2006.01)

(52) U.S. Cl.
CPC ........................................ *H02J 7/007* (2013.01)

(58) Field of Classification Search
CPC ............................................................ H02J 7/00
USPC ......................................................... 320/118
See application file for complete search history.

(56) References Cited

U.S. PATENT DOCUMENTS

| 5,956,241 A | 9/1999 | LoCascio | |
|---|---|---|---|
| 2011/0227414 A1* | 9/2011 | Fischer | 307/66 |
| 2011/0234164 A1* | 9/2011 | Furukawa | 320/118 |
| 2013/0002203 A1* | 1/2013 | Kuraishi | 320/134 |
| 2014/0042980 A1* | 2/2014 | Floros et al. | 320/134 |
| 2014/0152261 A1* | 6/2014 | Yamauchi et al. | 320/118 |

* cited by examiner

*Primary Examiner* — Mohammed Alam

(57) ABSTRACT

A battery equalization circuit is provided, comprising: a positive battery node connected to a positive terminal of a monitored battery cell contained in a battery circuit that includes a plurality of other battery cells connected in series with the monitored battery cell; a negative battery node connected to a negative terminal of the monitored battery cell; a secondary transformer coil configured to receive a square wave, the secondary transformer coil having an upper transformer node and a lower transformer node; an upper switch connected between the positive battery node and the upper transformer node; a lower switch connected between the negative battery node and the lower transformer control node; and a control circuit configured to control operation of the upper and lower switches based on a measured cell voltage between the positive battery node and the negative battery node, and a total battery voltage of the battery circuit.

18 Claims, 6 Drawing Sheets

CIRCUIT AND METHOD FOR VOLTAGE EQUALIZATION IN LARGE BATTERIES

FIELD OF THE INVENTION

The present invention relates in general to a system and method for controlling the equalization of battery cells in a multiple-cell battery. In particular it relates to a system and method for monitoring the voltage in each battery cell in a large multiple-cell battery, as well as the in the battery as a whole, and for equalizing the voltages in each of the individual battery cells so that they are approximately the same.

BACKGROUND OF THE INVENTION

Some simple batteries are made up of a single cell having a single voltage. For example, a common A cell battery is made up of a single 1.5, volt cell. However, many other batteries are made up of multiple battery cells that are connected together in series. For example, a common car battery could be made up of six 2, volt cells connected in series, while a battery for a hybrid car might be made up of an array of battery cells, some in series and some in parallel. Likewise, an electronic device might employ a battery made of a chain of smaller batteries connected in series.

In multiple-cell batteries, small differences between the cells (e.g., due to production tolerances or operating conditions) tend to be magnified with each charge or discharge cycle. In these situations, weaker cells are overstressed during charging, causing them to become even weaker, until they eventually fail and cause a premature failure of the whole battery. Voltage equalization (sometimes called cell balancing) is a way of compensating for these weaker cells by equalizing the charge on all the cells in the battery, thus extending the battery's life. It also serves to prevent the overcharge of any individual cell.

Even in a relatively stable battery, small differences in charge, rate of discharge, cell parameters, and cell age can result in different cell voltages for individual cells after a few charge and discharge cycles, leading to undesirable stress on the battery as the individual cell voltages begin to slide out of synchronization.

Therefore, in order to obtain good performance and lifespan for most rechargeable batteries, such as Li-ion batteries, each battery cell requires additional circuitry. The level of sophistication of these circuits varies widely and so does the cost. The simplest and lowest cost devices typically provide only passive equalization. In such a device, should the voltage of an individual cell exceed a preset level, a simple discharge circuit attached to the cell is activated to bring the cell voltage back to what is considered a "normal level." In such a device, any "excess" charge is wasted, typically turned into heat.

It would be desirable, therefore to provide a system and method of actively equalizing charge among cells in a multiple-cell battery. Such a system could periodically monitor the voltage in each battery cell in a battery or battery portion, and equalize the voltages in the batteries so that they all remain at the same voltage, or at least close to the same voltage. Furthermore, it would also be desirable if any charge removed from an overcharged battery were not wasted, but was instead moved to an undercharged battery instead, avoiding any wasted charge.

However, there is also a competing interest to keep the size, cost, and complexity of batteries low. Therefore, it would also be desirable for any active battery equalization system to be simple, energy efficient, small, and low cost.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, may be supported with or in integrated circuits (ICs), such as dynamic random access memory (DRAM) devices, static random access memory (SRAM) devices, or the like. In particular, they may be implemented using CMOS transistors. It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present invention, further discussion of such ICs will be limited to the essentials with respect to the principles and concepts used by the exemplary embodiments.

Battery Equalization Circuit

Figure 1:
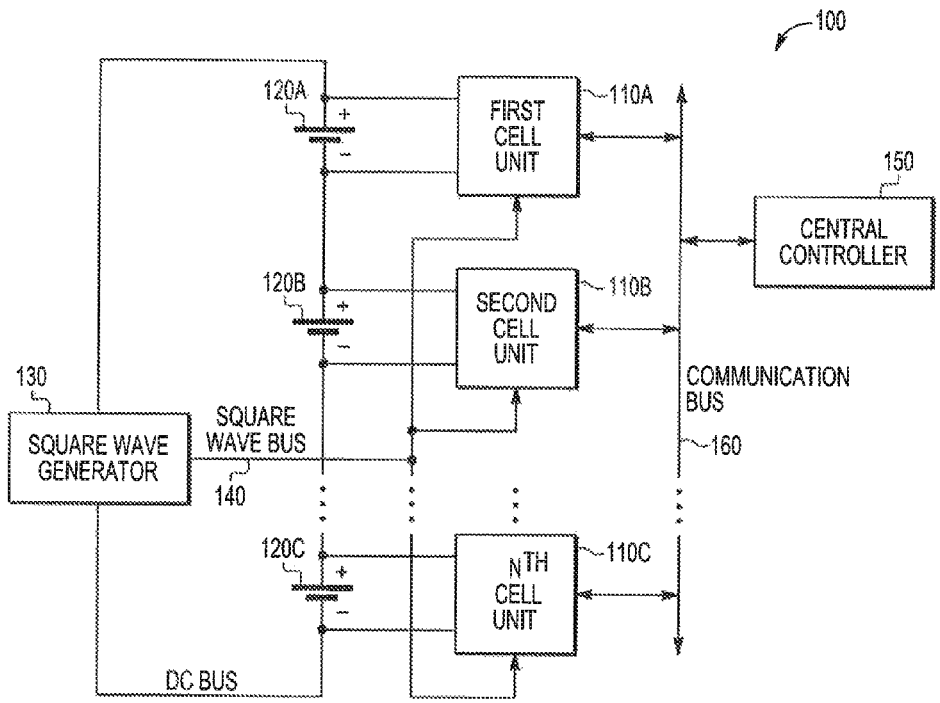
FIG. 1 is a circuit diagram of a multiple-cell battery and a battery equalization circuit according to a disclosed embodiment.

FIG. 1 is a circuit diagram of a multiple-cell battery and a battery equalization circuit 100 according to a disclosed embodiment. As shown in FIG. 1, the multiple-cell battery and a battery equalization circuit 100 includes first through $N^{th}$, cell units 110A, 110B, 110C, first through $N^{th}$, battery cells 120A, 120B, 120C, a square wave generator 130, a square wave bus 140, a central controller 150, and a communication bus 160. For ease of disclosure, an exemplary cell unit will be designated by the reference numeral 110, and an exemplary battery cell will be designated by the reference numeral 120.

The central controller communicates with the first through $N^{th}$, cell units 110A, 110B, 110C, and the square wave generator 130 through the communication bus 160. In particular, it provides each of these elements with all of the control signals they need to operate properly, and also receives data generated by these elements.

The square wave generator 130 operates to provide a square wave signal to the square wave bus 140, which is connected to each of the first through $N^{th}$, cell units 110A, 110B, 110C and provides the first through $N^{th}$, cell units 110A, 110B, 110C with the square wave. This square wave should have a frequency relatively low in comparison to the frequency at which the circuit 100 operates. In order to generate the square wave, square wave generator 130 receives a DC power supply (e.g., from the combined battery cells 120), and converts it to the AC bi-directional square wave signal. Thus, the square wave generator 130 acts as an DC/AC converter.

Furthermore, although a square wave generator 130 that provides a square wave signal is disclosed in this embodiment, alternate embodiments can employ any similar bi-polar power signal and corresponding signal generator. For example, square, semi-square, or the like.

In one embodiment, the square wave bus 140 can be implemented through the use of a transformer. In such an embodiment, the square wave generator 130 will include a primary winding on the transformer through which the square wave is passed, and each of the cell units 120 will include a secondary winding on the transformer, which will received the square wave provided to the primary winding. In alternate embodiments variations on this design can be used, e.g., individual transformers per cell unit.

The first through $N^{th}$, battery cells 120A, 120B, 120C are arranged in series to form a multiple-cell battery that provides a total battery voltage. These N battery cells 120 are each designed to have the same voltage output across its terminals.

In the disclosed embodiment, the bi-directional square wave generator 130 is powered by the entire voltage of the multiple-cell battery (i.e., a total voltage of the battery cells 120A, 120B, 120C). In this way, the square wave generator 130 receives the full voltage of the entire battery and converts it onto the square wave signal. Furthermore, by powering the square wave generator 130 from the whole battery voltage, the amplitude of the square wave signal is proportional to the voltage of the entire battery. The total battery voltage is measured and digitized by a separate ADC, with isolation.

The first through $N^{th}$, cell units 110A, 110B, 110C are each connected to a respective one of the first through $N^{th}$, battery cells 120A, 120B, 120C and operate to equalize the voltage of these battery cells 120 based on the square wave received from the square wave generator 130 over the square wave bus 140, and instructions received from the central controller 150 over the communication bus 160. In particular, each cell unit 110 operates to lower the voltage of the battery cell 120 it is connected to if it that voltage is above an optimal voltage, and to increase the voltage of the battery cell 120 it is connected to if it that voltage is below the optimal voltage.

Figure 2:
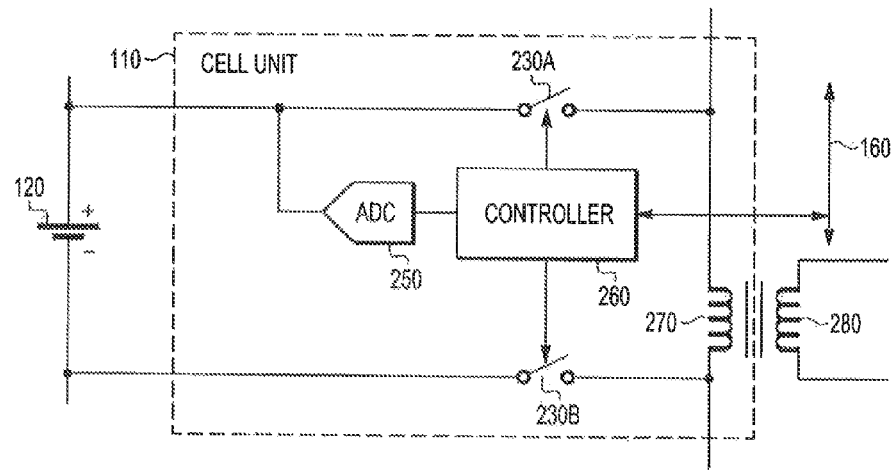
FIG. 2 is a circuit diagram of a cell unit from the multiple-cell battery and a battery equalization circuit of FIG. 1 according to a disclosed embodiment.

FIG. 2 is a circuit diagram of a cell unit 110 from the multiple-cell battery and a battery equalization circuit 100 of FIG. 1 according to a disclosed embodiment. As shown in FIG. 2 a cell unit 110 is connected to a battery cell 120, and includes an upper switch 230A, a lower switch 230B, an analog-to-digital converter (ADC) 250, a cell controller 260, and a secondary transformer winding 270. The cell unit has an upper connection line and a lower connection line that are connected to the positive and negative terminals, respectively, of the battery cell 120.

The battery cell 120 is described in more detail above with respect to FIG. 1. It is connected in series with the other battery cells that make up the multiple-cell battery.

The secondary transformer winding 270 is connected between the upper and lower connection lines and is wound around a transformer core. A primary transformer winding 280 that receives the square wave signal from the square wave generator 130 is also wrapped around the transformer core. Thus, the transformer serves as the square wave bus 140, allowing the secondary transformer winding 270 to receive the square wave signal generated by the square wave generator 130 through the transformer.

The secondary transformer winding 280 may be connected in series with the secondary transformer windings 280 in other cell units 110. In addition, although the primary transformer winding 280 is shown in FIG. 2, it is not apart of the cell unit, but is either a part of the square wave generator 130 or the square wave bus 140.

The upper connection line is formed between an upper node of the secondary transformer winding 280 and a positive terminal of the battery cell 120. Similarly, the lower connection line is formed between a lower node of the secondary transformer winding 280 and a negative terminal of the battery cell 120

The upper switch 230A is located in the upper connection line between the upper node of the secondary transformer winding 280 and the positive terminal of the first battery cell 120. When the upper switch 230A is closed, the upper node of the secondary transformer winding 280 and the positive terminal of the first battery cell 120 are connected by the upper connection line. When the upper switch 230A is open, the upper node of the secondary transformer winding 280 is disconnected from the positive terminal of the first battery cell 110.

Similarly, the lower switch 230B is located in the lower connection line between the lower node of the secondary transformer winding 280 and the negative terminal of the battery cell 120. When the lower switch 230B is closed, the lower node of the secondary transformer winding 280 and the negative terminal of the battery cell 120 are connected by the lower connection line. When the lower switch 230A is open, the lower node of the secondary transformer winding 280 is disconnected from the negative terminal of the battery cell 120.

The ADC 250 is connected to the upper connection line at a point between the positive terminal of the battery cell 120 and the upper switch 230A. The reference terminal of the ADC 250 is connected to the lower connection line at a point between the negative terminal of the battery cell 120 and the lower switch 230B. The voltage measuring circuit 240 operates to determine an analog voltage of the battery cell 120. The ADC 250 receives the analog voltage from the upper node of the battery cell 120 and converts it into a digital voltage. This digital voltage is then provided to the cell controller.

The cell controller 260 receives the digital voltage from the ADC 250, as well as control signals from the central controller 150 via the communication bus 160. It provides an upper switching control signal to control the operation of the upper switch 230A and a lower switching control signal to control the operation of the lower switch 230B, as well, as well as data to the central controller 150 via the communication bus 160.

A battery equalization circuit is provided, comprising: a first positive battery node configured to connect to a positive terminal of a first battery cell contained in a battery circuit that includes a plurality of other battery cells connected in series with the first monitored battery cell; a first negative battery node configured to connect to a negative terminal of the first battery cell; a first transformer coil configured to receive an output voltage of an AC generator, the first transformer coil having a first upper transformer node and a first lower transformer node; a first upper switch connected between the first positive battery node and the first upper transformer node; a first lower switch connected between the first negative battery node and the first lower transformer control node; and a control circuit configured to control the operation of the first upper switch and the first lower switch based on a first measured cell voltage between the first positive battery node and the first negative battery node, and a total battery voltage of the battery circuit.

The first upper switch and the first lower switch may both be bi-directional MOSFET switches.

The first battery cell and the plurality of other battery cells may all be configured to have the same preset voltage, and the total battery voltage of the battery circuit may be determined by measuring a voltage of all of the first battery cell and the plurality of other battery cells arranged in series with each other, and dividing the resulting voltage by a total number of battery cells, including the first battery cell and the plurality of other battery cells.

The battery equalization circuit may further comprise: a first analog-to-digital converter configured to determine a first analog voltage between the first positive battery node and the first negative battery node, and to convert the first analog cell voltage into a first digital cell voltage, wherein the control circuit uses the first digital cell voltage as the first measured cell voltage.

The battery equalization circuit may further comprise: a second positive battery node configured to connect to a positive node of a second battery cell selected from the plurality of other battery cells connected in series with the first battery cell; a second negative battery node configured to connect to a negative node of the second battery cell; a second transformer coil configured to receive the output voltage of the AC generator, the second transformer coil having a second upper transformer node and a second lower transformer node; a second upper switch connected between the second negative battery node and the second upper transformer node; and a second lower switch connected between the second positive battery node and the second lower transformer node, wherein the control circuit is further configured to control the operation of the second upper switch and the second lower switch based on a second measured cell voltage between the second positive battery node and the second negative battery node, and the total battery voltage of the battery circuit; and The second upper switch and the second lower switch may each comprise: a first MOSFET having a first drain electrode connected to a first switch node, a first source electrode connected to a first intermediate node, and a first gate electrode connected to a second intermediate node; a second MOSFET having a second drain electrode connected to a second switch node, a second source electrode connected to the first intermediate node, and a second gate electrode connected to the second intermediate node; a discharge resistor connected between the first intermediate node and the second intermediate node; and a center-tapped rectifier having an output line connected to the first intermediate node, a tap line connected to the second intermediate node, and a pair of input lines configured to receive a control waveform, wherein the control waveform controls whether the first and second MOSFET should pass current or not.

The battery equalization circuit may further comprise: a second analog-to-digital converter configured to determine a second analog voltage between the second positive battery node and the second negative battery node of the second battery cell, and to convert the second analog cell voltage into a second digital cell voltage, wherein the control circuit uses the second digital cell voltage as the second measured cell voltage.

Voltage Equalization Graph

Figure 3:
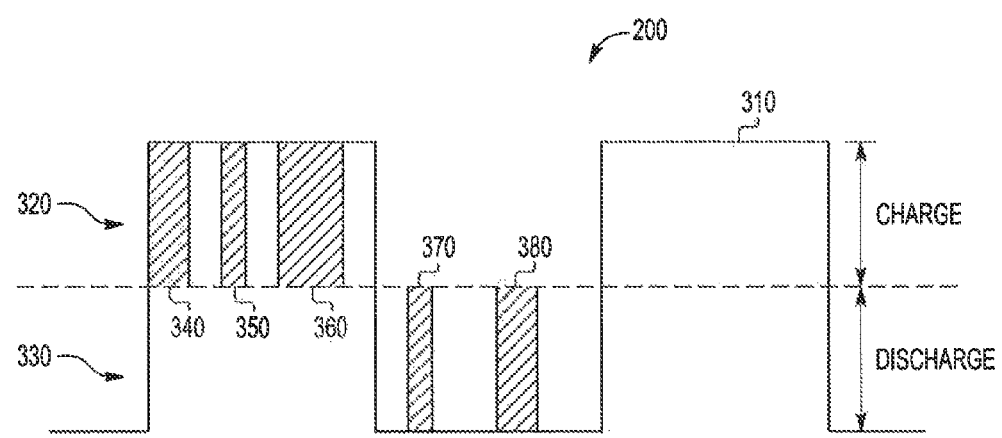
FIG. 3 is a graph of a square wave output by the square wave generator in FIG. 1, along with an indication as to how it is used to charge and discharge individual battery cells, according to a disclosed embodiment.

FIG. 3 is a graph 300 of a square wave output by the square wave generator 130 in FIG. 1, along with an indication as to how it is used to charge and discharge individual battery cells 120, according to a disclosed embodiment. As shown in FIG. 3, the square wave generator 130 generates a square wave 310, which has a positive half-cycle above zero volts, and a negative half-cycle below zero volts. Thus, half of the "squares" generated by the square wave generator 130 have a negative voltage, while the other half have a positive voltage.

Furthermore, as indicated in FIG. 3, a central controller may sequence and/or assign time slots to the individual switches so that the bi-directional AC generator is evenly loaded during each switching period. For example, if the $4^{th}$, $25^{th}$, and $36^{th}$, battery cells required additional charge the appropriate switches might not be turned ON at the same time, but rather in sequence. The switch for the $4^{th}$, battery cell might be turned ON, while the other two switches were OFF. When the switch for the $4^{th}$, battery was turned OFF, the switch for the $25^{th}$, battery could be turned ON. Then, when the switch for the $25^{th}$, battery was turned OFF, the switch for the $36^{th}$, battery could be turned ON. In a large battery, such sequencing may be spread over several switching periods of the bi-directional DC/AC converter.

To improve the loading of the bidirectional DC/AC converter, half of the secondary windings at the cell units may have opposite directions of their windings. This will enable direct transfer of the charge from the cells with higher voltage to the cells with the lower voltage, allowing reductions of the size of the bi-directional DC/AC converter, as well as the transformer between the DC/AC converter and the cells/clusters.

One exemplary cycle of the square wave 310 starts at time $T_1$, where the voltage is switched from −A volts to +A volts. The square wave 310 is maintained at +A volts until time $T_2$, when the voltage is then switched from +A volts back to −A volts. Then, the square wave 310 is maintained at −A volts until time $T_3$, at which point the voltage again moves from −A volts to +A volts, at which point a new cycle begins, in this way, the square wave 310 has a positive half 320 that occurs every other half-cycle, and a negative half 330 that occurs on the opposite half-cycles.

In operation, the positive half of the square wave 320 (i.e., that portion with the positive voltage +A) is used to charge battery cells 120 in the multiple-cell battery when they are undercharged. Similarly, the negative half of the square wave 320 (i.e., that portion with the negative voltage −A) is used to discharge battery cells 120 when they are overcharged. This allows the individual voltages of the battery cells 120 to be adjusted up and down as needed to allow them to more easily maintain a similar voltage.

For example, if the first battery cell 120A had a low voltage and needed to be charged, the central controller 150 and the cell controller 160 in the first cell unit 110A would activate (i.e., close) the upper and lower switches 230A and 230B in the first cell unit 110A to connect the first battery cell 120A to the square wave generator 130 via the square wave bus 140 (e.g., through a transformer, as shown in FIGS. 1 and 2) at a time $T_{P2}$, during a positive half-cycle of the square wave 310. The first battery call 120A would then accumulate a charge amount 350 until a time $T_{P3}$, at which point the central controller 150 and the cell controller 160 in the first cell unit 110A would deactivate (i.e., open) the upper and lower switches 230A and 230B, disconnecting the first battery cell 120A from the square wave generator 130. In this way, the first battery cell 120A would be charged by the charge amount 350 provided by the square wave 310 from time $T_{P2}$, to $T_{P3}$.

Similar)y, if the second battery cell 120B had a high voltage and needed to be discharged, the central controller 150 and the cell controller 160 in the second cell unit 110B would activate (i.e., close) the upper and lower switches 230A and 230B in the second cell unit 110B to connect the second battery cell 120B to the square wave generator 130 via the square wave bus 140 (e.g., through a transformer, as shown in FIGS. 1 and 2) at a time $T_{N1}$, during a negative half-cycle of the square wave 310. The second battery call 120B would then lose a charge amount 370 until a time $T_{N2}$, at which point the central controller 150 and the cell controller 160 in the second cell unit 110B would deactivate (i.e., open) the upper and lower switches 230A and 230B, disconnecting the second battery cell 120B from the square wave generator 130. In this way, the second battery cell 120B would be discharged by the charge amount 370 drained by the square wave 310 from time $T_{N1}$, to $T_{N2}$.

Since the activation and deactivation times of the upper and lower switches 230A and 230B in the cell units 110 can be varied, this system allows a desired amount of charge to be added or subtracted from one of the battery cells 120A, 120B, 120C. All that is necessary is to set the switch activation and deactivation times to achieve a desired charge amount to be added to or subtracted from the selected battery cell 110.

Furthermore, since the switch activation and deactivation times can be varied throughout a positive half-cycle of the square wave 310 or a negative half-wave of the square wave 310, multiple battery cells 120 can be charged or discharged during a given half-cycle of the square wave 310. For example, as shown by way of example in FIG. 3, three battery cells are charged during one positive half-cycle, and two battery cells are discharged during one negative half-cycle. In particular, a first battery cell 120 is charged by a charge amount 340 between times $T_1$, and $T_{P1}$; a second battery cell 120 is charged by a charge amount 350 between times $T_{P2}$, and $T_{P3}$; and a third battery cell 120 is charged by a charge amount 360 between times $T_{P4}$, and $T_{P5}$. Likewise, a fourth battery cell 120 is discharged by a charge amount 370 between times $T_{N1}$, and $T_{N2}$; and a fifth battery cell 120 is charged by a charge amount 380 between times $T_{N3}$, and $T_{N4}$. Many variations are possible based on the charging and discharging needs of the system. For example, more or fewer battery cells 120 could be charged or discharged during a single half-cycle. Likewise, charging and discharging times could start or end at the beginning or end of the respective half-cycle, and charging or discharging periods could be immediately adjacent to each other (i.e., one set of switches 230A, 230E in a cell unit 110 could be opened as another set of switches 230A, 230B in a different cell unit 110 were closed).

Battery Equalization Circuit with Overlapping Cell Units

Figure 4:
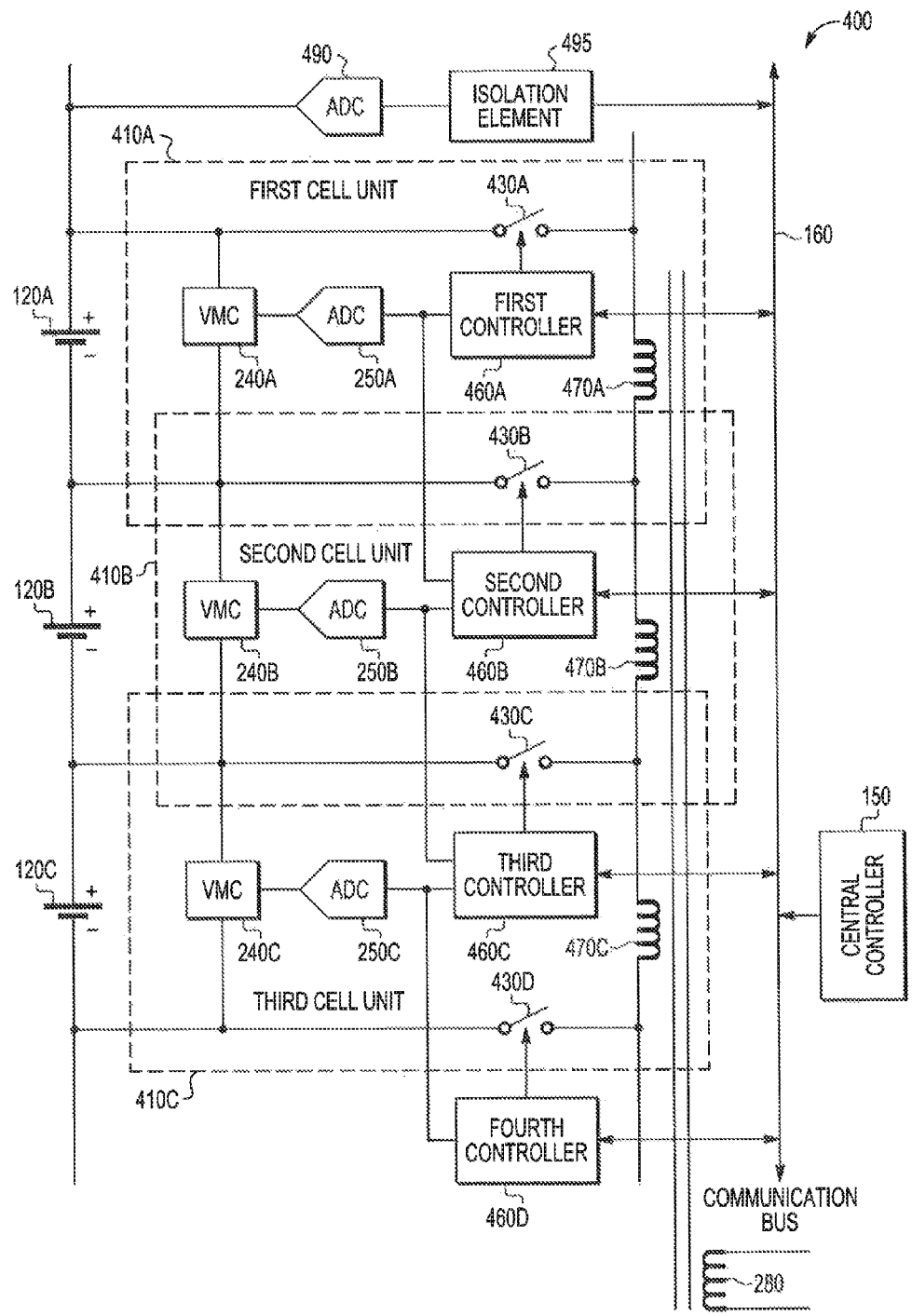
FIG. 4 is a circuit diagram of a multiple-cell battery and a battery equalization circuit according to an alternate disclosed embodiment.

FIG. 4 is a circuit diagram of a multiple-cell battery and a battery equalization circuit 400 according to an alternate disclosed embodiment. As shown in FIG. 4, the multiple-cell battery and a battery equalization circuit 400 includes first through $N^{th}$, cell units 410A, 410B, 410C, first through $N^{th}$, battery cells 120A, 120B, 120C, a communication bus 160, a primary transformer winding 280, and a transformer core 485. A square wave generator and a central controller (not shown) may also be included, as shown in FIG. 1. For ease of disclosure, an exemplary cell unit will be designated by the reference numeral 410, and an exemplary battery cell will be designated by the reference numeral 120.

Each cell unit 420 is connected to a battery cell 120, and includes upper and lower switches 430, an analog-to-digital converter (ADC) 450, a cell controller 460, and a secondary transformer winding 470. The cell unit 420 has an upper connection line and a lower connection line that are connected to the positive and negative terminals, respectively, of the battery cell 120. In addition, one extra controller 460 is provided The primary transformer winding 280 receives a square wave from a square wave generator and provides it to the first through $N^{th}$, cell units 410A, 410B, 410C through the transformer core 485. As noted above, a square wave is used in this embodiment by way of example. Any appropriate bi-directional signal could be supplied to the primary transformer 280.

The first through third battery cells 120A, 120B, 120C are arranged in series to form a multiple-cell battery that provides a total battery voltage. These three battery cells 120 are each designed to have the same voltage output.

The first through third cell units 410A, 4108, 410C are each connected to a respective one of the first through third battery cells 120A, 120B, 120C and operate to equalize the voltage of these battery cells 120 based on the square wave received from the primary transformer winding 280 via the transformer core 485. In particular, each cell unit 110 operates to lower the voltage of the battery cell 120 it is connected to if it that voltage is above an optimal voltage, and to increase the voltage of the battery cell 120 it is connected to if it that voltage is below the optimal voltage.

The first through third secondary transformer windings 470A, 470B, 470C are connected in series with each other, and are wrapped around the same transformer core 485 as the primary transformer coil 280. Each of the first through third secondary transformer windings 470A, 470B, 470C serves as a secondary transformer winding 470 for a corresponding one of the first through third cell units 410A, 410B, 410C As shown in FIG. 4, the first through third cell units 410A, 410B, 410C are formed in an overlapping pattern. In this pattern, each cell unit 410 shares one or two connection lines/switches with an adjacent cell unit 410. The end cell units 410 (in this embodiment, the first and third cell units 410A, 410C) have only one adjacent cell unit 410, and so only share one switch/connection line with an adjacent cell unit 410. All other cell units 410 (only the second cell unit 410B in this embodiment) have two adjacent cell units 410, and share a switch/connection line with each of the adjacent cell units 410.

In particular, the first cell unit 410A employs a first switch 430A as an upper switch in an upper connection line that is connected between an upper node of a first secondary transformer winding 470A and a positive node of the first battery cell 120A. Similarly, the first cell unit 410A employs a second switch 430B as a lower switch in a lower connection line that is connected between a lower node of the first secondary transformer winding 470A and a negative node of the first battery cell 120A.

However, the second cell unit 410B employs the second switch 430B as an upper switch, and the connection line the second switch 430B is formed in serves as the upper connection line in the second cell unit 410B. Since an upper node of the second secondary winding 470B is connected to the lower node of the first secondary winding 470A, and the positive terminal of the second battery cell 120B is connected to the negative terminal of the first battery cell 120A, the second switch 430B is also connected between an upper node of the second secondary transformer winding 470B and a positive node of the second battery cell 120C. The second cell unit 410B then employs a third switch 430C as a lower switch in a lower connection line that is connected between a lower node of the second secondary transformer winding 470B and a negative node of the second battery cell 120B.

However, the third cell unit 410C employs the third switch 430C as an upper switch, and the connection line the third switch 430C is formed in serves as the upper connection line in the third cell unit 410C. Since an upper node of the third secondary winding 470C is connected to the lower node of the second secondary winding 470B, and the positive terminal of the third battery cell 120C is connected to the negative terminal of the second battery cell 120B, the third switch 430C is also connected between an upper node of the third secondary transformer winding 470C and a positive node of the third battery cell 120C. The third cell unit 410C then employs a fourth switch 430D as a lower switch in a lower connection line that is connected between a lower node of the third secondary transformer winding 470C and a negative node of the third battery cell 120C.

In this way, each cell unit 410 contains both an upper switch and a lower switch. It just happens that some switches can perform as an upper switch for one cell unit 410 and can perform as a lower switch for another cell unit 410.

The first through third voltage measuring circuits 440A, 440B, 440C, are each connected between the positive and negative terminals of a respective one of the first through third battery cells 120A, 120B, 120C. The first through third voltage measuring circuits 440A, 440B, 440C operate to respectively determine first through third analog voltages of each of the first through third battery cells 120A, 120B, 120C.

The first through third ADCs 450A, 450B, 450C, receive the first through third analog voltages from the first through third voltage measuring circuits 440A, 440B, 440C, respectively, and convert them into first through third digital voltages. These digital voltages are then provided to the first through fourth cell controllers 460A, 460B, 460C, 460D.

The first through fourth cell controllers 460A, 460B, 460C, 460D are configured to control the operation of the first through fourth switches 430A, 430B, 430C, 430D, respectively, based on control signals received from the central controller 150 over the communication bus 160, and the digital voltages received from the first through third ADCs 450A, 450B, 450C. Because there are four total switches 430A, 430B, 430C, 430D, there must be four total cell controllers 460A, 460B, 460C, 460D. More generically, N cell units 410 will require (N+1) switches 430 and (N+1) cell controllers. In some embodiments, the cell controllers 460A, 460B, 460C, 460D can be implemented as multiplexers.

Although FIG. 4 discloses an embodiment that includes three cell units/battery cells, the number of cell units/battery cells can vary in different embodiments.

A battery equalization circuit is provided, comprising: a first battery node configured to connect to a positive node of a first battery cell contained in a battery circuit; a second battery node configured to connect to a negative node of the first battery cell and a positive node of a second battery cell; a third battery node configured to connect to a negative node of the second battery cell; a fourth battery node configured to connect to a negative node of the third battery cell; a first transformer coil configured to receive an output voltage of an AC generator, the first transformer coil being connected between a first transformer node and a second transformer node; a second transformer coil configured to receive the output voltage of an AC generator, the second transformer coil being connected between the second transformer node and a third transformer node; a third transformer coil configured to receive the output voltage of an AC generator, the third transformer coil being connected between the third transformer node and a fourth transformer node; a first switch connected between the first battery node and the first transformer node; a second switch connected between the second battery node and the second transformer node; a third switch connected between the third battery node and the third transformer node; a fourth switch connected between the fourth battery node and the fourth transformer node; a first control circuit configured to control the operation of the first switch based on a first measured cell voltage between the first battery node and the second battery node, and the total battery voltage; a second control circuit configured to control the operation of the second switch based on the first measured cell voltage, a second measured cell voltage between the second battery node and the third battery node, and the total battery voltage; a third control circuit configured to control the operation of the third switch based on the second measured cell voltage, a third measured cell voltage between the third battery node and the fourth battery node, and the total battery voltage of the battery circuit; and a fourth control circuit configured to control the operation of the fourth switch based on the third measured cell voltage and the total battery voltage; wherein the first, second, and third battery cells are arranged in series with each other.

The first switch, the second switch, the third switch, and the fourth switch may each comprise: a first MOSFET having a first drain electrode connected to a first switch node, a first source electrode connected to a first intermediate node, and a first gate electrode connected to a second intermediate node; a second MOSFET having a second drain electrode connected to a second switch node, a second source electrode connected to the first intermediate node, and a second gate electrode connected to the second intermediate node; a discharge resistor connected between the first intermediate node and the second intermediate node; and a center-tapped rectifier having an output line connected to the first intermediate node, a tap line connected to the second intermediate node, and a pair of input lines configured to receive a control waveform, wherein the control waveform controls whether the first and second MOSFET should pass current or not.

The battery equalization circuit may further comprise: a first analog-to-digital converter connected between the first battery node and the second battery node, and configured to determine a first analog cell voltage, and to convert the first analog cell voltage into a first digital cell voltage, a second analog-to-digital converter connected between the second battery node and the third battery node, and configured to determine a second analog cell voltage, and to convert the second analog cell voltage into a second digital cell voltage, a third analog-to-digital converter connected between the third battery node and a fourth battery node, and configured to determine a third analog cell voltage, and to convert the third analog cell voltage into a third digital cell voltage, wherein the first control circuit and the second control circuit use the first digital cell voltage as the first measured cell voltage, the second control circuit and the third control circuit use the second digital cell voltage as the second measured cell voltage, and the third control circuit and the fourth control circuit use the third digital cell voltage as the third measured cell voltage.

Bi-Directional Switch

Figure 5:
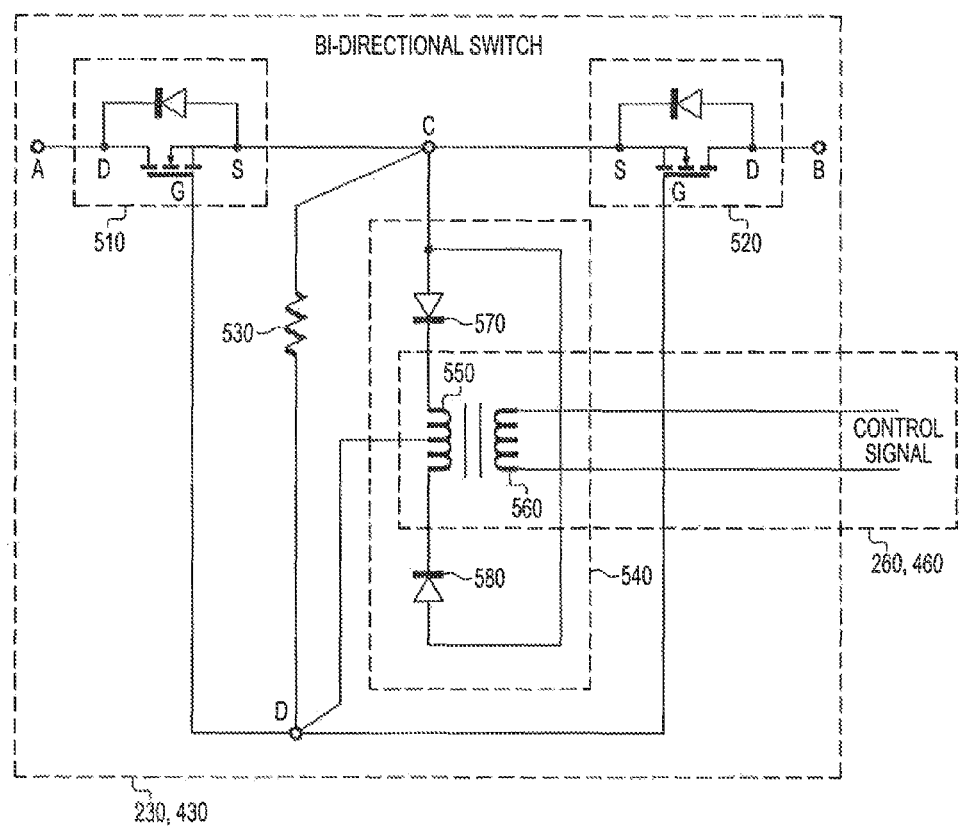
FIG. 5 is a circuit diagram of a bi-directional switch from the multiple-cell battery and a battery equalization circuits of FIGS. 1 and 4 according to a disclosed embodiment.

FIG. 5 is a circuit diagram of a bi-directional switch 230 430 from the multiple-cell battery and a battery equalization circuits 100, 400 of FIGS. 1 and 4 according to a disclosed embodiment. As shown in FIG. 5, the bi-directional switch 230, 430 includes a first MOSFET 510, a second MOSFET 520, a discharge resistor 530, and a switch control circuit 540. The switch control circuit 540 further includes a secondary transformer winding 550, a primary transformer winding 560, a first diode 570, and a second diode 580.

The first MOSFET 510 and the second MOSFET 520 are formed in series with each other between first and second external nodes A and B. In particular, the drain of the first MOSFET 510 is connected to the first external node A, the drain of the second MOSFET 510 is connected to the second external node B, the sources of both the first and second MOSFETs 510, 520 are connected to an intermediate node C, and the gates of both the first and second MOSFETs 510, 520 are connected to a control node D.

The discharge resistor 530 and the switch control circuit 540 are connected in parallel between the intermediate node C and the control node D.

The switch control circuit 540 is a center-tapped rectifier connected to the intermediate node C, and having its tap connected to the control node D.

The secondary transformer winding 550 and the primary transformer winding 560 are both wrapped around the same transformer core. The primary transformer winding 560 receives a control signal, which it transfers to the secondary transformer winding 550. The secondary transformer winding 550 is connected at a first terminal to a cathode of the first diode 570 and at a second terminal to a cathode of the second diode 580, and has a tap connected to the control node D.

The first diode 570 has its cathode connected to the first terminal of the secondary transformer winding 550 and its anode connected to the intermediate node C. Similarly, the second diode 580 has its cathode connected to the second terminal of the secondary transformer winding 550 and its anode connected to the intermediate node C.

As a result of this configuration, control of the gates of the first and second MOSFETs 510 and 520 is based on the principle of the push-pull center tapped rectifier 540 and the discharge resistor 530.

Cell Unit Controller

Figure 7:
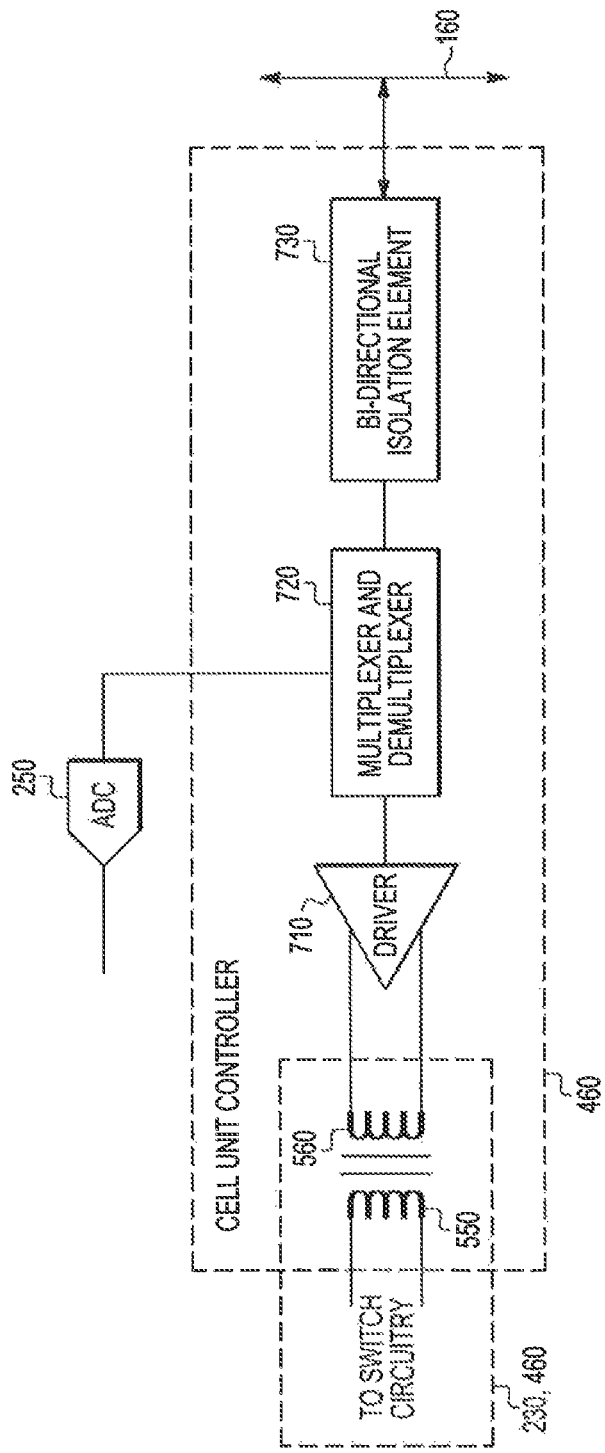
FIG. 7 is a circuit diagram of a cell unit controller of FIG. 4 according to a disclosed embodiment.

FIG. 7 is a circuit diagram of a cell unit controller 460 of FIG. 4 according to a disclosed embodiment.

Method of Battery Equalization

Figure 6:
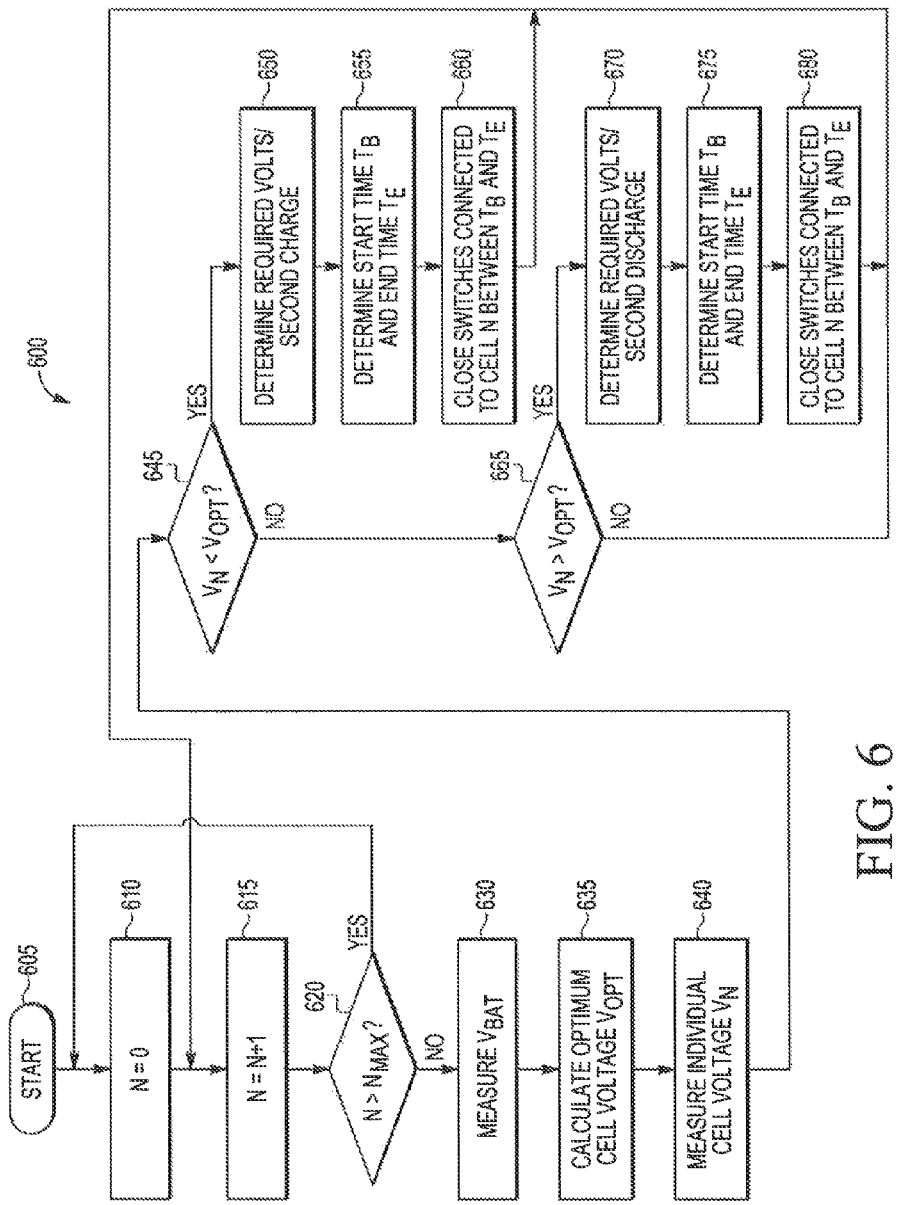
FIG. 6 is flow chart of a battery equalization operation according to a disclosed embodiment.

FIG. 6 is flow chart of a battery equalization operation 600 according to a disclosed embodiment. This operation can be performed on an entire multiple-cell battery or on a multiple-cell battery cluster formed in a multiple-cluster battery. A goal of this operation 600 is to equalize the voltages in each of a plurality of battery cells such that they are all at approximately the same voltage, or that they are at least all approaching the same voltage.

As shown in FIG. 6, this operation 600 starts (605) and a value of N is set equal to 0. (610) N is an index of the battery cells that are formed together in the associated battery and so must be equalized. $N_{MAX}$, represents the total number of battery cells in the associated battery.

N is then incremented by one (615) to represent moving on to the next battery cell to be equalized. On the first pass through this step, N is incremented from 0, to 1, indicating that the first battery cell is to be equalized. Once the last battery cell has been equalized, this step will increment N from $N_{MAX}$, ($N_{MAX}$+1).

The operation 600 then determines whether N is greater than $N_{MAX}$, i.e., whether the last battery cell has been equalized. (620) If N is greater than $N_{MAX}$, (i.e., every battery cell has been equalized), the process will return to operation 610, resetting and 20, and repeating the equalization process. if N is not greater than $N_{MAX}$, (i.e., not every battery cell has been equalized), then the operation 600 proceeds to measure the total battery voltage $V_{BAT}$, of the battery or battery cluster. (630) The total battery voltage $V_{BAT}$, is the sum of the voltages of the $V_{MAX}$, battery cells that make up the battery, and is measured and digitized by a separate ADC.

An optimum cell voltage $V_{OPT}$, is then calculated based on the total battery voltage $V_{BAT}$. (635) In the disclosed embodiments, the optimum cell voltage $V_{OPT}$, is equal to the total battery voltage $V_{BAT}$, divided by the total number of battery cells $N_{MAX}$, (i.e., $$\left(\text{i.e., } V_{OPT} = \frac{V_{BAT}}{N_{MAX}}\right).$$

Then an individual cell voltage $V_N$, is determined. (640) This individual cell voltage $V_N$, is the voltage of the $N^{th}$, battery cell (for the current value of N). As noted above in FIGS. 1, 2, 4, and 5, there are various ways in which this individual cell voltage $V_N$, can be measured.

The operation 600 then determines whether the individual cell voltage $V_N$, is less than $V_{OPT}$, (i.e., whether the $N^{th}$, battery cell is undercharged with respect to the optimum voltage $V_{OPT}$). (645)

If the individual cell voltage $V_N$, is less than $V_{OPT}$, (i.e., the $N^{th}$, battery cell is undercharged), then it will be necessary to charge the $N^{th}$, battery cell to increase its voltage. This is accomplished by determining the amount of charge that must be added to the $N^{th}$ battery cell to equalize the voltage $V_N$, of the $N^{th}$, battery cell (i.e., bring the voltage $V_N$, of the $N^{th}$, battery cell to, or close to, $V_{OPT}$). (650)

Since the desired amount of charge that will be provided is related to the time that the $N^{th}$, battery cell is connected to the positive half-cycle of the square wave signal, it is only necessary to determine how long during a positive cycle of the square wave signal the $N^{th}$ battery cell should be connected to the square wave signal. This can be accomplished by determining a connection start time $T_{PS}$, and a connection end time $T_{PE}$, within a positive half-cycle of the square wave signal that will result in the desired connection time and thereby achieve the desired amount of charging for the $N^{th}$, battery cell. (655)

Once it has determined the connection start time $T_{PS}$, and the connection end time $T_{PE}$, the system need only close the switches connected to the $N^{th}$, battery cell from time $T_{PS}$ to time $T_{PE}$. (660) This will connect the $N^{th}$, battery cell to the positive cycle of the square wave signal for the desired amount of time, and will therefore provide the $N^{th}$, battery cell with the desired amount of charging.

The operation 600 then determines whether the individual cell voltage $V_N$, is greater than $V_{OPT}$, (i.e., whether the $N^{th}$, battery cell is overcharged with respect to the optimum voltage $V_{OPT}$). (665)

If the individual cell voltage $V_N$, is greater than $V_{OPT}$, (i.e., the $N^{th}$, battery cell is overcharged), then it will be necessary to discharge the $N^{th}$, battery cell to decrease its voltage. This is accomplished by determining the amount of charge that must be taken away from the $N^{th}$, battery cell to equalize the voltage $V_N$, of the $N^{th}$, battery cell (i.e., bring the voltage $V_N$, of the $N^{th}$, battery cell to, or close to, $V_{OPT}$). (670)

Since the desired amount of discharge that will be provided is related to the time that the $N^{th}$, battery cell is connected to the negative half-cycle of the square wave signal, it is only necessary to determine how long during a negative cycle of the square wave signal (the square wave signal in the disclosed embodiment) the $N^{th}$, battery cell should be connected to the square wave signal. This can be accomplished by determining a connection start time $T_{NS}$ and a connection end time $T_{NE}$, within a negative half-cycle of the square wave signal that will result in the desired connection time and thereby achieve the desired amount of discharging for the $N^{th}$, battery cell. (675)

Once it has determined the connection start time $T_{NS}$, and the connection end time $T_{NE}$, the system need only close the switches connected to the $N^{th}$, battery cell from time $T_{NS}$ to time $T_{NE}$. (680) This will connect the $N^{th}$, battery cell to the negative cycle of the square wave signal for the desired amount of time, and will therefore provide the $N^{th}$, battery cell with the desired amount of discharging.

If the individual cell voltage $V_N$, is neither greater than nor less than the optimum voltage $V_{OPT}$, the $N^{th}$, battery cell has the optimum voltage $V_{OPT}$, and no correction need be made. The process then returns to operation 615, where N is incremented by one, and the equalization process continues.

Once any necessary voltage optimization is performed (either through charging or discharging the $N^{th}$, battery cell), operation returns to step 615, where N is incremented by 1, moving to the next battery cell, and operation continues.

In this way, every battery cell in a battery or battery cluster can be checked and equalized. In this embodiment the total battery voltage $V_{BAT}$, is newly measured during the equalization operation of a given battery cell. This is because the total voltage of the battery will fluctuate slightly as individual battery cells are charged and discharged. However, in alternate embodiments the total battery voltage $V_{BAT}$, could be measured once at the beginning of each battery equalization process and that value for $V_{BAT}$, could be used for the next run from first through $N_{MAX}{}^{th}$, battery cells.

A method of equalizing a battery is provided, including: measuring a total voltage of a battery containing N battery cells arranged in series with each other; determining an optimum cell voltage based on the measured total voltage and the value of N; measuring a selected cell voltage of a selected battery cell from the N battery cells; determining whether the measured cell voltage is less than the optimum cell voltage; connecting the selected battery cell to a voltage output of a generator during a portion of a positive cycle of the voltage output of the AC generator, when it is determined that the measured cell voltage is less than the optimum cell voltage; determining whether the measured cell voltage is greater than the optimum cell voltage; and connecting the selected battery cell to the voltage output of the generator during a portion of the negative cycle of the voltage output of the AC generator, when it is determined that the measured cell voltage is greater than the optimum cell voltage, where N is an integer greater than 1.

The optimum cell voltage may be equal to the measured total voltage divided by the total number of the battery cells in the plurality of battery cells.

The operations of measuring the total voltage of the battery, determining the optimum cell voltage, measuring the selected cell voltage, determining whether the measured cell voltage is less than the optimum cell voltage, connecting the selected battery cell to the voltage output of a generator during a positive cycle of the generator when it is determined that the measured cell voltage is less than the optimum cell voltage, determining whether the measured cell voltage is greater than the optimum cell voltage, and connecting the selected battery cell to the voltage output of the generator during a negative cycle of the generator when it is determined that the measured cell voltage is greater than the optimum cell voltage may be repeated N times to allow each of the N battery cells to serve as the selected cell once.

The operation of connecting the selected battery cell to the voltage output of a generator during a positive cycle of the generator when it is determined that the measured cell voltage is less than the optimum cell voltage may further comprise: determining a connection duration of the positive cycle during which the selected cell should be connected to the voltage output of the generator; determining a connection starting point during the positive cycle at which the selected cell should be connected to the voltage output of the AC generator and a connection ending point during the positive cycle at which the selected cell should he disconnected from the voltage output of the AC generator, so that the selected cell will be connected to the voltage output of the generator for the connection duration; connecting the selected battery cell to the voltage output of the generator at the determined connection starting point; and disconnecting the selected battery cell from the voltage output of the generator at the determined connection ending point.

The selected battery cell maybe connected to the output voltage of the generator through a transformer.

The operation of connecting the selected battery cell to the voltage output of the generator at the determined connection starting point may further comprises: closing a first switch connected between a positive terminal of the selected battery cell and a first terminal of the output voltage of the generator to connect the positive terminal of selected battery cell to the first terminal of the output voltage of the generator; and closing a second switch connected between a negative terminal of the selected battery cell and a second terminal of the output voltage of the generator to connect the negative terminal of selected battery cell to the second terminal of the output voltage of the generator.

The operation of connecting the selected battery cell to the voltage output of the generator at the determined connection starting point may further comprise: closing a first switch connected between a positive terminal of the selected battery cell and a first terminal of the output voltage of the generator at the determined connection starting point to connect the positive terminal of selected battery cell to the first terminal of the output voltage of the generator, and closing a second switch connected between a negative terminal of the selected battery cell and a second terminal of the output voltage of the generator at the determined connection starting point to connect the negative terminal of selected battery cell to the second terminal of the output voltage of the generator; and the operation of disconnecting the selected battery cell from the voltage output of the generator at the determined connection ending point may further comprise: opening the first switch at the connection ending point to disconnect the positive terminal of selected battery cell from the first terminal of the output voltage of the generator, and opening the second switch at the connection ending point to disconnect the negative terminal of selected battery cell from the second terminal of the output voltage of the generator.

The first switch and the second switch may each comprise: a first MOSFET having a first drain electrode connected to a first switch node, a first source electrode connected to a first intermediate node, and a first gate electrode connected to a second intermediate node; a second MOSFET having a second drain electrode connected to a second switch node, a second source electrode connected to the first intermediate node, and a second gate electrode connected to the second intermediate node; a discharge resistor connected between the first intermediate node and the second intermediate node; and a center-tapped rectifier having an output line connected to the first intermediate node, a tap line connected to the second intermediate node, and a pair of input lines configured to receive a control waveform, wherein the control waveform controls whether the first and second MOSFET should pass current or not.

The operation of connecting the selected battery cell to the voltage output of a generator during a negative cycle of the generator when it is determined that the measured cell voltage is greater than the optimum cell voltage may further comprise: determining a connection duration of the negative cycle during which the selected cell should be connected to the voltage output of the generator; determining a connection starting point during the negative cycle at which the selected cell should be connected to the voltage output of the AC generator and a connection ending point during the negative cycle at which the selected cell should be disconnected from the voltage output of the AC generator, so that the selected cell will be connected to the voltage output of the generator for the connection duration; connecting the selected battery cell to the voltage output of the generator at the determined connection starting point; and disconnecting the selected battery cell from the voltage output of the generator at the determined connection ending point.

The operation of connecting the selected battery cell to the voltage output of the generator at the determined connection starting point may further comprise: closing a first switch connected between a positive terminal of the selected battery cell and a first terminal of the output voltage of the generator at the determined connection starting point to connect the positive terminal of selected battery cell to the first terminal of the output voltage of the generator, and closing a second switch connected between a negative terminal of the selected battery cell and a second terminal of the output voltage of the generator at the determined connection starting point to connect the negative terminal of selected battery cell to the second terminal of the output voltage of the generator; and the operation of disconnecting the selected battery cell from the voltage output of the generator at the determined connection ending point may further comprise: opening the first switch at the connection ending point to disconnect the positive terminal of selected battery cell from the first terminal of the output voltage of the generator, and opening the second switch at the connection ending point to disconnect the negative terminal of selected battery cell from the second terminal of the output voltage of the generator.

The output of the generator may be provided through a N transformer windings, each connectable to a corresponding one of the N battery cells, a first N/2, battery cells may be configured such that a positive node is connectable to an upper node of a corresponding transformer winding, and a negative note is connectable to a lower note of the corresponding transformer winding, and a second N/2, battery cells may be configured such that a negative node is connectable to an upper node of a corresponding transformer winding, and a positive note is connectable to a lower note of the corresponding transformer winding.

Conclusion

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled. The various circuits described above can be implemented in discrete circuits or integrated circuits, as desired by implementation.

What is claimed is:

1. A battery equalization circuit, comprising:
   a first positive battery node configured to connect to a positive terminal of a first battery cell contained in a battery circuit that includes a plurality of other battery cells connected in series with the first monitored battery cell;
   a first negative battery node configured to connect to a negative terminal of the first battery cell;
   a first transformer coil configured to receive an output voltage of an AC generator, the first transformer coil having a first upper transformer node and a first lower transformer node;
   a first upper switch connected between the first positive battery node and the first upper transformer node;
   a first lower switch connected between the first negative battery node and the first lower transformer control node;
   a control circuit configured to control the operation of the first upper switch and the first lower switch based on a first measured cell voltage between the first positive battery node and the first negative battery node, and a total battery voltage of the battery circuit;
   a second positive battery node configured to connect to a positive node of a second battery cell selected from the plurality of other battery cells connected in series with the first battery cell;
   a second negative battery node configured to connect to a negative node of the second battery cell;
   a second transformer coil configured to receive the output voltage of the AC generator, the second transformer coil having a second upper transformer node and a second lower transformer node;
   a second upper switch connected between the second negative battery node and the second upper transformer node; and
   a second lower switch connected between the second positive battery node and the second lower transformer node,
   wherein the control circuit is further configured to control the operation of the second upper switch and the second lower switch based on a second measured cell voltage between the second positive battery node and the second negative battery node, and the total battery voltage of the battery circuit.

2. The battery equalization circuit of claim 1, wherein the first upper switch and the first lower switch are both bi-directional MOSFET switches.

3. The battery equalization circuit of claim 1, wherein
the first battery cell and the plurality of other battery cells are all configured to have the same preset voltage, and
wherein the total battery voltage of the battery circuit is determined by measuring a voltage of all of the first battery cell and the plurality of other battery cells arranged in series with each other, and dividing the resulting voltage by a total number of battery cells, including the first battery cell and the plurality of other battery cells.

4. The battery equalization circuit of claim 1, further comprising
a first analog-to-digital converter configured to determine a first analog voltage between the first positive battery node and the first negative battery node, and to convert the first analog cell voltage into a first digital cell voltage,
wherein the control circuit uses the first digital cell voltage as the first measured cell voltage.

5. The battery equalization circuit of claim 1, wherein the second upper switch and the second lower switch each comprise
a first MOSFET having a first drain electrode connected to a first switch node, a first source electrode connected to a first intermediate node, and a first gate electrode connected to a second intermediate node;
a second MOSFET having a second drain electrode connected to a second switch node, a second source electrode connected to the first intermediate node, and a second gate electrode connected to the second intermediate node;
a discharge resistor connected between the first intermediate node and the second intermediate node; and
a center-tapped rectifier having an output line connected to the first intermediate node, a tap line connected to the second intermediate node, and a pair of input lines configured to receive a control waveform,
wherein the control waveform controls whether the first and second MOSFET should pass current or not.

6. The battery equalization circuit of claim 1, further comprising
a second analog-to-digital converter configured to determine a second analog voltage between the second positive battery node and the second negative battery node of the second battery cell, and to convert the second analog cell voltage into a second digital cell voltage,
wherein the control circuit uses the second digital cell voltage as the second measured cell voltage.

7. A battery equalization circuit, comprising:
a first battery node configured to connect to a positive node of a first battery cell contained in a battery circuit;
a second battery node configured to connect to a negative node of the first battery cell and a positive node of a second battery cell;
a third battery node configured to connect to a negative node of the second battery cell;
a fourth battery node configured to connect to a negative node of the third battery cell;
a first transformer coil configured to receive an output voltage of an AC generator, the first transformer coil being connected between a first transformer node and a second transformer node;
a second transformer coil configured to receive the output voltage of an AC generator, the second transformer coil being connected between the second transformer node and a third transformer node;
a third transformer coil configured to receive the output voltage of an AC generator, the third transformer coil being connected between the third transformer node and a fourth transformer node;
a first switch connected between the first battery node and the first transformer node;
a second switch connected between the second battery node and the second transformer node;
a third switch connected between the third battery node and the third transformer node;
a fourth switch connected between the fourth battery node and the fourth transformer node;
a first control circuit configured to control the operation of the first switch based on a first measured cell voltage between the first battery node and the second battery node, and the total battery voltage;
a second control circuit configured to control the operation of the second switch based on the first measured cell voltage, a second measured cell voltage between the second battery node and the third battery node, and the total battery voltage;
a third control circuit configured to control the operation of the third switch based on the second measured cell voltage, a third measured cell voltage between the third battery node and the fourth battery node, and the total battery voltage of the battery circuit; and
a fourth control circuit configured to control the operation of the fourth switch based on the third measured cell voltage and the total battery voltage;
wherein the first, second, and third battery cells are arranged in series with each other, and
wherein the first switch, the second switch, the third switch, and the fourth switch each comprise
a first MOSFET having a first drain electrode connected to a first switch node, a first source electrode connected to a first intermediate node, and a first gate electrode connected to a second intermediate node;
a second MOSFET having a second drain electrode connected to a second switch node, a second source electrode connected to the first intermediate node, and a second gate electrode connected to the second intermediate node;
a discharge resistor connected between the first intermediate node and the second intermediate node; and
a center-tapped rectifier having an output line connected to the first intermediate node, a tap line connected to the second intermediate node, and a pair of input lines configured to receive a control waveform,
wherein the control waveform controls whether the first and second MOSFET should pass current or not.

8. The battery equalization circuit of claim 7, further comprising
a first analog-to-digital converter connected between the first battery node and the second battery node, and configured to determine a first analog cell voltage, and to convert the first analog cell voltage into a first digital cell voltage,
a second analog-to-digital converter connected between the second battery node and the third battery node, and configured to determine a second analog cell voltage, and to convert the second analog cell voltage into a second digital cell voltage, a third analog-to-digital converter connected between the third battery node and a fourth battery node, and configured to determine a third analog cell voltage, and to convert the third analog cell voltage into a third digital cell voltage, wherein the first control circuit and the second control circuit use the first digital cell voltage as the first measured cell voltage, the second control circuit and the third control circuit use the second digital cell voltage as the second measured cell voltage, and the third control circuit and the fourth control circuit use the third digital cell voltage as the third measured cell voltage.

9. A method of equalizing a battery, including:

measuring a total voltage of a battery containing N battery cells arranged in series with each other;

determining an optimum cell voltage based on the measured total voltage and the value of N;

measuring a selected cell voltage of a selected battery cell from the N battery cells;

determining whether the measured cell voltage is less than the optimum cell voltage;

connecting the selected battery cell to a voltage output of a generator during a portion of a positive cycle of the voltage output of the AC generator, when it is determined that the measured cell voltage is less than the optimum cell voltage;

determining whether the measured cell voltage is greater than the optimum cell voltage; and connecting the selected battery cell to the voltage output of the generator during a portion of the negative cycle of the voltage output of the AC generator, when it is determined that the measured cell voltage is greater than the optimum cell voltage, where N is an integer greater than 1, wherein the operation of connecting the selected battery cell to the voltage output of a generator during a positive cycle of the generator when it is determined that the measured cell voltage is less than the optimum cell voltage further comprises determining a connection duration of the positive cycle during which the selected cell should be connected to the voltage output of the generator;

determining a connection starting point during the positive cycle at which the selected cell should be connected to the voltage output of the AC generator and a connection ending point during the positive cycle at which the selected cell should be disconnected from the voltage output of the AC generator, so that the selected cell will be connected to the voltage output of the generator for the connection duration;

connecting the selected battery cell to the voltage output of the generator at the determined connection starting point; and disconnecting the selected battery cell from the voltage output of the generator at the determined connection ending point.

10. The method of claim 9, wherein the optimum cell voltage is equal to the measured total voltage divided by the total number of the battery cells in the plurality of battery cells.

11. The method of claim 9, wherein the operations of measuring the total voltage of the battery, determining the optimum cell voltage, measuring the selected cell voltage, determining whether the measured cell voltage is less than the optimum cell voltage, connecting the selected battery cell to the voltage output of a generator during a positive cycle of the generator when it is determined that the measured cell voltage is less than the optimum cell voltage, determining whether the measured cell voltage is greater than the optimum cell voltage, and connecting the selected battery cell to the voltage output of the generator during a negative cycle of the generator when it is determined that the measured cell voltage is greater than the optimum cell voltage are repeated N times to allow each of the N battery cells to serve as the selected cell once.

12. The method of claim 9, wherein the operation of connecting the selected battery cell to the voltage output of a generator during a positive cycle of the generator when it is determined that the measured cell voltage is less than the optimum cell voltage further comprises:

determining a connection duration of the positive cycle during which the selected cell should be connected to the voltage output of the generator;

determining a connection starting point during the positive cycle at which the selected cell should be connected to the voltage output of the AC generator and a connection ending point during the positive cycle at which the selected cell should be disconnected from the voltage output of the AC generator, so that the selected cell will be connected to the voltage output of the generator for the connection duration;

connecting the selected battery cell to the voltage output of the generator at the determined connection starting point; and disconnecting the selected battery cell from the voltage output of the generator at the determined connection ending point.

13. A method of equalizing a battery, including:

measuring a total voltage of a battery containing N battery cells arranged in series with each other;

determining an optimum cell voltage based on the measured total voltage and the value of N;

measuring a selected cell voltage of a selected battery cell from the N battery cells;

determining whether the measured cell voltage is less than the optimum cell voltage;

connecting the selected battery cell to a voltage output of a generator during a portion of a positive cycle of the voltage output of the AC generator, when it is determined that the measured cell voltage is less than the optimum cell voltage;

determining whether the measured cell voltage is greater than the optimum cell voltage; and connecting the selected battery cell to the voltage output of the generator during a portion of the negative cycle of the voltage output of the AC generator, when it is determined that the measured cell voltage is greater than the optimum cell voltage, where N is an integer greater than 1 wherein the selected battery cell is connected to the output voltage of the generator through a transformer, wherein the first switch and the second switch each comprise a first MOSFET having a first drain electrode connected to a first switch node, a first source electrode connected to a first intermediate node, and a first gate electrode connected to a second intermediate node;

a second MOSFET having a second drain electrode connected to a second switch node, a second source electrode connected to the first intermediate node, and a second gate electrode connected to the second intermediate node;

a discharge resistor connected between the first intermediate node and the second intermediate node; and a center-tapped rectifier having an output line connected to the first intermediate node, a tap line connected to the second intermediate node, and a pair of input lines configured to receive a control waveform, wherein the control waveform controls whether the first and second MOSFET should pass current or not.

14. The method of claim 12, wherein the operation of connecting the selected battery cell to the voltage output of the generator at the determined connection starting point further comprises closing a first switch connected between a positive terminal of the selected battery cell and a first terminal of the output voltage of the generator to connect the positive terminal of selected battery cell to the first terminal of the output voltage of the generator; and closing a second switch connected between a negative terminal of the selected battery cell and a second terminal of the output voltage of the generator to connect the negative terminal of selected battery cell to the second terminal of the output voltage of the generator.

15. The method of claim 12, wherein the operation of connecting the selected battery cell to the voltage output of the generator at the determined connection starting point further comprises closing a first switch connected between a positive terminal of the selected battery cell and a first terminal of the output voltage of the generator at the determined connection starting point to connect the positive terminal of selected battery cell to the first terminal of the output voltage of the generator, and closing a second switch connected between a negative terminal of the selected battery cell and a second terminal of the output voltage of the generator at the determined connection starting point to connect the negative terminal of selected battery cell to the second terminal of the output voltage of the generator; and the operation of disconnecting the selected battery cell from the voltage output of the generator at the determined connection ending point further comprises opening the first switch at the connection ending point to disconnect the positive terminal of selected battery cell from the first terminal of the output voltage of the generator, and opening the second switch at the connection ending point to diconnect the negative terminal of selected battery cell from the second terminal of the output voltage of the generator.

16. A method of equalizing a battery, including:

measuring a total voltage of a battery containing N battery cells arranged in series with each other;

determining an optimum cell voltage based on the measured total voltage and the value of N;

measuring a selected cell voltage of a selected battery cell from the N battery cells;

determining whether the measured cell voltage is less than the optimum cell voltage;

connecting the selected battery cell to a voltage output of a generator during a portion of a positive cycle of the voltage output of the AC generator, when it is determined that the measured cell voltage is less than the optimum cell voltage;

determining whether the measured cell voltage is greater than the optimum cell voltage; and connecting the selected battery cell to the voltage output of the generator during a portion of the negative cycle of the voltage output of the AC generator, when it is determined that the measured cell voltage is greater than the optimum cell voltage, where N is an integer greater than 1, wherein the operation of connecting the selected battery cell to the voltage output of a generator during a negative cycle of the generator when it is determined that the measured cell voltage is greater than the optimum cell voltage further comprises:

determining a connection duration of the negative cycle during which the selected cell should be connected to the voltage output of the generator;

determining a connection starting point during the negative cycle at which the selected cell should be connected to the voltage output of the AC generator and a connection ending point during the negative cycle at which the selected cell should be disconnected from the voltage output of the AC generator, so that the selected cell will be connected to the voltage output of the generator for the connection duration;

connecting the selected battery cell to the voltage output of the generator at the determined connection starting point; and disconnecting the selected battery cell from the voltage output of the generator at the determined connection ending point.

17. The method of claim 16, wherein the operation of connecting the selected battery cell to the voltage output of the generator at the determined connection starting point further comprises closing a first switch connected between a positive terminal of the selected battery cell and a first terminal of the output voltage of the generator at the determined connection starting point to connect the positive terminal of selected battery cell to the first terminal of the output voltage of the generator, and closing a second switch connected between a negative terminal of the selected battery cell and a second terminal of the output voltage of the generator at the determined connection starting point to connect the negative terminal of selected battery cell to the second terminal of the output voltage of the generator; and the operation of disconnecting the selected battery cell from the voltage output of the generator at the determined connection ending point further comprises opening the first switch at the connection ending point to disconnect the positive terminal of selected battery cell from the first terminal of the output voltage of the generator, and opening the second switch at the connection ending point to disconnect the negative terminal of selected battery cell from the second terminal of the output voltage of the generator.

18. The method of claim 9, wherein the output of the generator is provided through a N transformer windings, each connectable to a corresponding one of the N battery cells, a first N/2 battery cells are configured such that a positive node is connectable to an upper node of a corresponding transformer winding, and a negative note is connectable to a lower note of the corresponding transformer winding, and a second N/2 battery cells are configured such that a negative node is connectable to an upper node of a corresponding transformer winding, and a positive note is connectable to a lower note of the corresponding transformer winding.

\* \* \* \* \*